March 1, 1938. H. G. FRENCH 2,109,991
CURRENT COLLECTING DEVICE
Original Filed Nov. 15, 1934
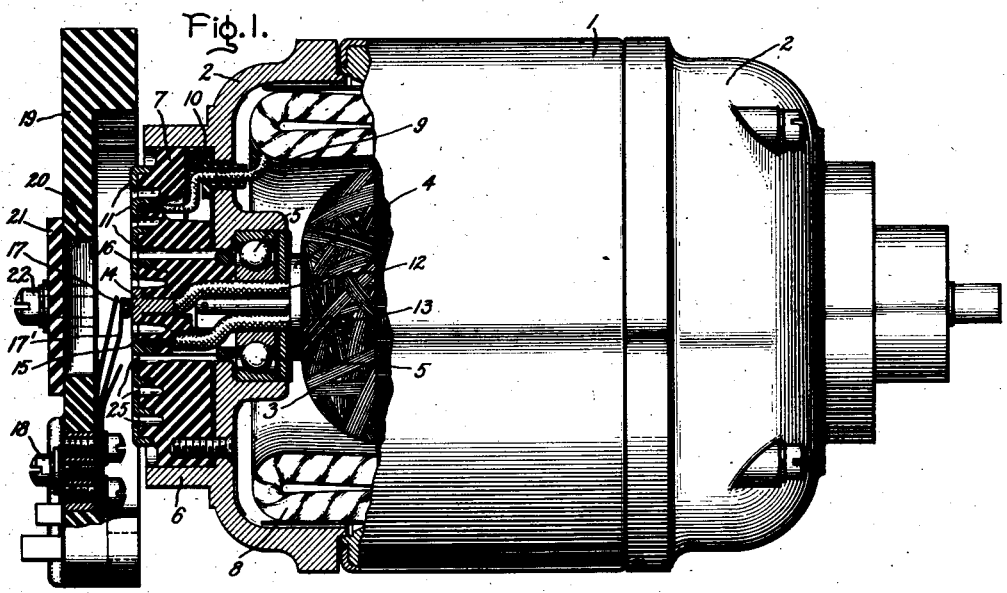
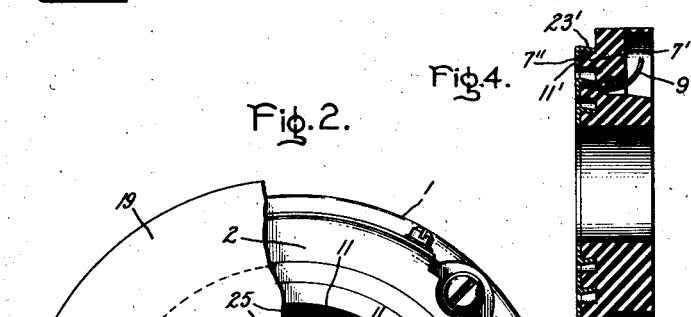
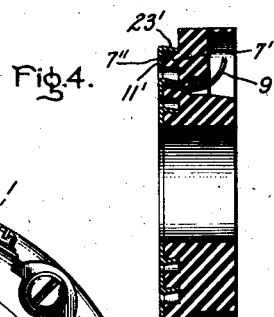
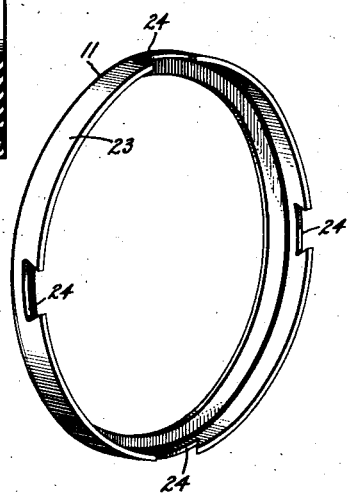
Inventor:
Henry G. French,
by Harry E. Dunham
His Attorney.

Patented Mar. 1, 1938

2,109,991

UNITED STATES PATENT OFFICE 2,109,991

CURRENT COLLECTING DEVICE

Henry G. French, Schenectady, N. Y., assignor to General Electric Company, a corporation of New York Application November 15, 1934, Serial No. 753,115
Renewed December 1, 1937

7 Claims. (Cl. 171—322)

My invention relates to current collecting device, as for dynamo-electric machines, including self-synchronizing motors and the like, more particularly to a collector ring assembly, and has for its principal object the provision of an improved and inexpensive collector ring assembly and method of making the same.

Current collecting rings for self-synchronizing motors of the rotatable stator type are generally concentrically disposed at one end of the motor. The mounting for these rings however has in the past proved to be comparatively expensive where a high degree of accuracy is required. One method previously used comprised embedding a plurality of studs about a circle in an insulating mounting and securing, as by a countersunk rivet mounting, a collector ring to said studs. In order to provide a substantially plane contact surface for the rings, they were subjected to a finishing operation when secured in position on said insulating mounting. The various steps in manufacture combined with the high quality of workmanship required for this method resulted in a comparatively expensive collector ring assembly.

In accordance with my invention the collector rings for each assembly are stamped from a single metal plate or disc, the material occupying the spacing between rings providing an annular anchor flange for each ring. The rings may be secured or anchored with respect to an insulating mounting by either a moulding or pressing operation.

In the moulding operation, which is preferable where a large number of ring assemblies are required, the contact faces of the rings are concentrically positioned with respect to a single plane and an insulating material, as a phenolic condensation product, is moulded around portions of said rings and anchor flanges so as securely to position the same. Since the rings may be accurately positioned at the beginning of the moulding operation, there is little necessity for further machining.

My invention will be more fully set forth in the following description referring to the accompanying drawing, and the features of novelty which characterize my invention will be pointed out with particularity in the claims annexed to and forming a part of this specification.

Referring to the drawing, Fig. 1 is a side view, partly in section, of a self-synchronizing motor of the rotatable stator type provided with current collecting means embodying my invention; Fig. 2 is an end view, partly in section, of the motor shown in Fig. 1; Fig. 3 is a perspective view of one of the current collector rings, and Fig. 4 is a fragmentary view illustrating another form of my invention.

The motor illustrated by Fig. 1 comprises a rotatable stator structure 1, including end shields 2, and a rotor 3. The stator 1 is rotatably mounted on the rotor shaft 4 as by ball bearing mountings 5. In motors of the above-described type, the current conductors to the rotor and stator windings are led out to current collector rings mounted on and carried by the rotor and stator structures, respectively, the external circuits being completed by suitable brushes or contacts bearing on the collector rings.

In the present instance one end shield 2 of the motor is provided with a cylindrical axial extension 6 within which is suitably positioned an insulating mounting 7 for the stator collector rings hereinafter described. A three-phase stator winding 8 is illustrated in the present instance, each phase tap 9 extending through an insulating bushing 10 in the end shield for connection to the corresponding collector ring 11.

The current leads 12 and 13 from the rotor 3 likewise extend axially of the motor shaft to connect with rotor collector rings 14 and 15, respectively. These rotor collector rings are also carried by an insulating mounting 16 secured to and rotatable with the rotor shaft.

The external circuit connections are established through resiliently mounted contacts 17 bearing individually on the rings as best illustrated by Fig. 2. The contacts 17, which are composed of a suitable contact material as silver, are suitably mounted on flexible bronze strips 17' with respect to corresponding terminal structures 18 carried by an insulating mounting 19. The insulating mounting plate 19 is provided with a rectangular opening 20 normally closed by an insulating cover plate 21 suitably secured as at 22 to the plate 19.

The rotor and stator collector rings in the present instance are composed of a high quality contact material as silver, for example, the oxide of which has comparatively low resistance. However, in view of the cost of this contact material, it is highly desirable that the collector rings be stamped from the blanks with as little waste material as possible.

According to a preferred form of my invention, the rotor and stator rings for a single assembly are stamped from a disc of silver, the metal in the space between the rings being turned down to form an axially extending annular right angle anchor flange 23, as illustrated by Fig. 3. The anchor flange, which in various forms of my invention does not necessarily form an exact right angle with the ring contact surface, serves a further purpose in strengthening and stiffening the ring itself, thereby maintaining more accurately the contact surface in a plane. The anchor flange 23 is in the present instance formed at the outer periphery of the collector ring and is suitably provided with dovetail notches 24 for securing the collector ring with respect to its insulating mounting in a manner presently described. The notches 24 limit the material in the flange only to the point where the ring is adequately stiffened.

With the collector rings stamped and formed, as illustrated in Fig. 3, the rings are next assembled for the moulding operation. This is accomplished by accurately positioning the rings in a mould concentrically with their faces in the same plane, the corresponding rotor and stator leads being soldered to the rings at the anchor flanges 23. A suitable insulating material, as a phenolic condensation product, is thereupon moulded to the collector rings so that the space defined by the angle between each ring and its anchor flange is filled with insulation to form an annular raised portion as illustrated by Fig. 1. Accordingly the anchor flange 23 of each ring is permanently and securely united to the insulating mounting by the interlocking insulating portions in the anchor flange notches 24. Annular recesses 25 between the rings are formed in the insulation so as to eliminate possibility of short circuit.

The center collector ring 14 may obviously be in the form of a stud, as illustrated, provided with a shank which is suitably secured in the separately moulded insulating mounting 7 as by screw threaded engagement.

It will, therefore, be apparent that the collector ring assembly comprising the rotor and stator rings and insulating mountings therefor is completed at the end of the moulding operations since the ring contact faces are positioned in substantially the same plane and, therefore, require no further machining other than possibly a light facing or polishing of the contact surfaces. The simplicity and compactness of the arrangement furthermore reduces the overall length of the collector ring assembly and therefore that of the motor.

The arrangement illustrated by Fig. 4 may be used to advantage when a moulding operation would be expensive, as where a limited number of ring assemblies are required. The insulating mounting 7' is turned from a blank of insulating material generally to the form of the above described moulded support, the raised annular insulating portions on which the rings are mounted being undercut on one side as at 7''. The collector ring 11', as in the previous case, is formed with a substantially right angle annular anchor flange 23'. A conductor 9' extending through an aperture drilled in the support 7' is soldered or otherwise connected to the inner wall of the flange. The ring is secured to the support 7' by placing it on the corresponding annular portion and pressing, as by a spinning operation, the anchor flange into engagement with the undercut surface at 7''. The ring 11' is therefore rigidly, permanently and accurately locked in position to its insulating support. The other rings are secured to the support 7' in the same manner and the faces of all of the rings are lightly faced or polished.

It will be apparent that the anchor flange if desired may be in either case formed at the inner periphery of the ring, and in the molding operation the flange may extend at an angle greater than 90° from the ring contact surface.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Current collecting device structure comprising an insulating support having an annular raised portion, a collector ring having a plane contact surface, and means including an axially extending annular flange formed on said collector ring at an angle therewith and engaging and being interlocked with a side wall of said annular portion of said insulating support for mounting said collector ring thereon.

2. Current collecting device structure comprising a plurality of collector rings each having an annular anchor flange, said rings being spaced and having the contact faces thereof concentrically arranged and in the same plane, and means for supporting and rigidly positioning said rings comprising an insulating structure interlocked with said anchor flanges.

3. Current collecting device structure comprising a plurality of collector rings each having an annular anchor flange at the outer periphery thereof, said rings being spaced and having the contact faces thereof concentrically arranged and in the same plane, and an insulating structure interlocked with said anchor flanges and abutting each ring within the angle defined by its flange for mounting and rigidly positioning said ring.

4. In a dynamo-electric machine, current collecting device comprising a plurality of collector rings, each having a flat contact face defined by a plane and having an annular anchor flange extending at approximately a right angle from said face, said rings being spaced and having the contact faces thereof concentrically arranged and in the same plane, and an insulating mounting for rigidly positioning said rings comprising an insulating structure having annular raised portions interlocked with said annular flanges, said portions abutting said rings within the angle defined by said flange and spaced to form an annular recess between each of said rings.

5. In a dynamo-electric machine, current collecting device comprising a collector ring having a flat contact face defined by a plane and having an annular right angle anchor flange, said flange having dovetail notches therein, and an insulating mounting for rigidly supporting said ring comprising a moulded insulating structure positioned within the angle defined by said ring and flange and interlocked by said notches with said flange.

6. In a dynamo-electric machine, current collecting device structure comprising an insulating support having an annular raised portion, a side wall of said portion being undercut, and a collector ring having a plane contact surface mounted on said annular portion, said ring having an annular flange engaging said undercut wall so as to lock said ring on said raised portion.

7. In a dynamo-electric machine, current collecting device structure comprising an insulating support having annular raised portions presenting faces in the same transverse plane, a side wall of each of said portions being undercut, and collector rings having plane contact surfaces mounted on said annular portions in engagement with the plane surfaces on said raised portions, each of said rings having an annular flange engaging said undercut wall so as to lock said ring on said raised portions.

HENRY G. FRENCH.